United States Patent [19]
Tanaka

[11] Patent Number: 5,206,853
[45] Date of Patent: Apr. 27, 1993

[54] APPARATUS AND METHOD FOR DETECTING INTERSYMBOL INTERFERENCE

[75] Inventor: Shinichi Tanaka, Kyoto, Japan

[73] Assignee: Matsushita Electric Industrial Co., Ltd., Osaka, Japan

[21] Appl. No.: 661,534

[22] Filed: Feb. 27, 1991

[30] Foreign Application Priority Data

Feb. 28, 1990 [JP] Japan ................................. 2-47609

[51] Int. Cl.⁵ .............................................. G11B 7/00
[52] U.S. Cl. ......................................... 369/54; 360/31; 360/45; 369/116; 369/124
[58] Field of Search ................. 360/31, 40, 45, 51; 369/44.27, 44.29, 44.35, 53–55, 58, 116, 124; 324/212

[56] References Cited

U.S. PATENT DOCUMENTS

| | | | |
|---|---|---|---|
| 3,648,688 | 3/1972 | O'Hanlon, Jr. et al. | |
| 4,081,756 | 3/1978 | Price et al. | 360/45 X |
| 4,521,816 | 6/1985 | Kougami et al. | 360/45 |
| 4,672,363 | 6/1987 | Tanaka et al. | 360/40 X |
| 4,679,181 | 7/1987 | Naito | 369/44.27 |
| 4,760,472 | 7/1988 | Minuhin et al. | 360/51 X |
| 4,965,782 | 10/1990 | Mathews | 369/53 X |
| 5,068,754 | 11/1991 | Garde | 360/45 |
| 5,070,495 | 12/1991 | Bletscher, Jr. et al. | 369/116 |

OTHER PUBLICATIONS

"Evaluation Method for Magneto-Optical Disk System Based on Jitter Measurement" by Shinich Tanaka and Yuichi Fukamachi from EIC. No. MR90-36 (Oct. 23, 1990).

Primary Examiner—W. R. Young
Attorney, Agent, or Firm—Wenderoth, Lind & Ponack

[57] ABSTRACT

An apparatus for detecting an intersymbol interference occurred in a digital signal during signal transmission includes a test pattern generator, which would produce the largest intersymbol interference on a recording medium and reading the test pattern therefrom. The apparatus further includes a measuring circuit for measuring short transition intervals representing one bit pattern and producing a reproduction signal, and a rectangular signal with, reference to a predetermined threshold. The apparatus includes a calculating circuit for calculating the total intersymbol interference by a bit length and measured transition intervals. Furthermore, the apparatus detects the total intersymbol interference by measuring long transition intervals representing four series of bit patterns and the short transition intervals.

26 Claims, 4 Drawing Sheets

APPARATUS AND METHOD FOR DETECTING INTERSYMBOL INTERFERENCE

BACKGROUND OF THE INVENTION

1. Field of the Invention

The present invention relates to an apparatus and a method for detecting an intersymbol interference for use in a record reproduction apparatus.

2. Description of the Prior Art

It has been recently important to control a recording medium as magnetic recording has recently shown much progress and a writable optical disk has been realized for practical use, which has a high recording density. The higher recording density makes a recording margin narrow, and accordingly it is important to control a recording reproduction system.

In an optical recording, a light spot which has a power distribution expressed nearly by a Gaussian distribution is used for recording. A spot mark is recorded which extends at the bottom, and tends to vary easily in size with a variation in recording power. In addition, the optical recording widely uses a thermal recording medium and, therefore the recorded mark can be easily changed in shape by heat conduction. Therefore, the recording condition changes to reduce the signal amplitude, increasing the intersymbol interference. Therefore, it is also necessary to inspect the most suitable recording power for an optical recording medium. In order to know the most suitable condition, it is necessary to measure the degree of the intersymbol interference for evaluating the characteristics of the recorded medium.

Generally the characteristics of the recording reproduction system are evaluated by noise characteristics and frequency characteristics. These characteristics have been evaluated with a measurement in the frequency domain using a spectrum analyzer. For example, as an evaluation-.method, it is possible to reproduce a signal at the highest frequency and measure its C/N ratio (carrier to noise ratio).

However, the method mentioned above needs an inspection in the frequency domain with the spectrum analyzer and makes an automation measurement difficult. There is still a problem that the measurement at the frequency domain does not directly guarantees the characteristics in a time domain at which a signal is practically treated. For the purpose of knowing a practical margin with various variation factors, jitter in the time domain has been measured. For example, the measurement of jitter is disclosed in U.S. Pat. No. 3,648,688 which does not disclose a signal pattern for measuring an intersymbol interference but rather discloses a calculation of the standard deviation only. Such a measurement of total jitter is sufficiently helpful for evaluating whether or not the practical characteristics are suitable. However, according to the measurement of total jitter, it is difficult to recognize each jitter due to the variation of each of the various variation factors.

SUMMARY OF THE INVENTION

The object of the present invention is therefore to provide an imaging device which solves these problems.

The present invention has been developed with a view to substantially solving the above described disadvantages and has for its essential object to provide an improved electrophotographic imaging device.

In order to achieve the aforementioned objective, an apparatus for detecting an intersymbol interference in a digital signal read out from a recording medium comprises a clock generator for generating clock pulses having a predetermined cycle length, and a pattern writing means for writing a predetermined data pattern on the medium. The data pattern has a short transition interval positioned between two long transition intervals;

The apparatus further comprises a reading means for reading the data pattern on the medium, a measuring means for measuring the short transition interval, and a calculating means for calculating an edge shift between the short transition interval and the long transition interval.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
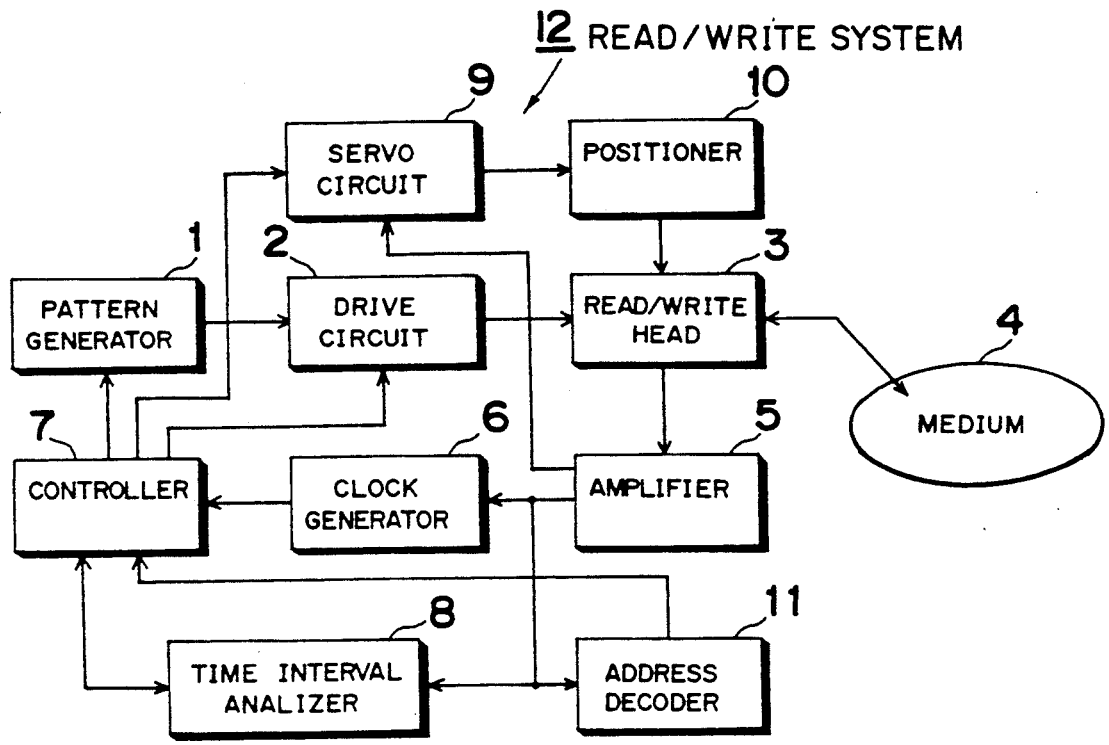
FIG. 1 is a block diagram showing an apparatus for detecting an intersymbol interference according to the present invention.

In general, an intersymbol interference is observed in a digital signal transmitted through a transmission system of insufficient bandwidth. When a rectangular unit pulse is transmitted through such a transmission system the waveform of a response signal becomes smoothed and is stretched so as to exceed a width of the unit pulse. This stretching of the response signal causes intersymbol interference. A read/write system, which reads/writes a signal from/onto a medium, is one of transmission systems. A digital signal is recorded on a recording medium with marks and spaces. In an optical recording system, a mark and a space may correspond to exposed and non-exposed portions, respectively. In a magnetic recording system, a mark and a space being non-marked may correspond to two directions of magnetization. Read out signals from these recording medium also include intersymbol interference. Intersymbol interference occurs not only in the recording process but also during the read out process. When an intersymbol interference occurs in, the recording process, the length of the mark and the space deviate from a standard length. When an intersymbol interference occurs in the read out process an edge of a read out signal runs out from the standard position even if the mark and the space are recorded on a medium in the standard length.

The digital signal may be in two states: a high level state referred to as an "H state" and a low level state referred to as and "L state". When the shortest data H state formed by only one mark is sandwiched between two long L states which are formed by a plurality of non-marked areas, it takes rather a long time before the L state turns to the H state, and it takes rather a short time before the H state returns to L state, because the signal waveform of the H state is deformed towards the signal level of the L state. Therefore, the edges at opposite sides of the signal representing the H state shows a largest shift to a direction to which the both side edges approach each other. On the contrary, when the shortest data L state formed by only one non-marked area is sandwiched between a plurality of marked areas, it takes rather a long time before the H state turns to the L state, and it takes rather a short time before the L state returns to the H state, because the signal waveform of the L sate is deformed towards the signal level of the H state. In another words when the minimum transition interval is sandwiched between the maximum transition intervals, the intersymbol interference becomes the greatest while the minimum transition interval is made shorter. As a practical matter, even if the longest data arrangement corresponding to the H state or the L state is slightly short but is longer than a predetermined length, there is no appreciable decrease in the edge shift due to the intersymbol interference.

The present invention provides an apparatus and a method for detecting the degree of intersymbol interference and measuring the detected intersymbol interference can be used to inspect the frequency characteristics relating to the practical application.

Referring to FIG. 1, a block diagram of an apparatus for detecting an intersymbol interference employed in a recording and reproducing apparatus according to the present invention is shown. A recording medium 4 has a track address information for recording data. A controller 7 provides an instruction to a position setting device 10 to move a read/write head 3 to the track wherein a test pattern is to be recorded. More specifically, the position setting device 10 follows the instruction from the controller 7 and moves the read/write head 3 to the target track while the read/write head 3 reads the target track and produce a track address signal therefrom. An amplifier 5 amplifies the signal produced by the read/write head 3 and an address decoder 11 reads the address signal from the output signal of the amplifier 5.

Figure 2:
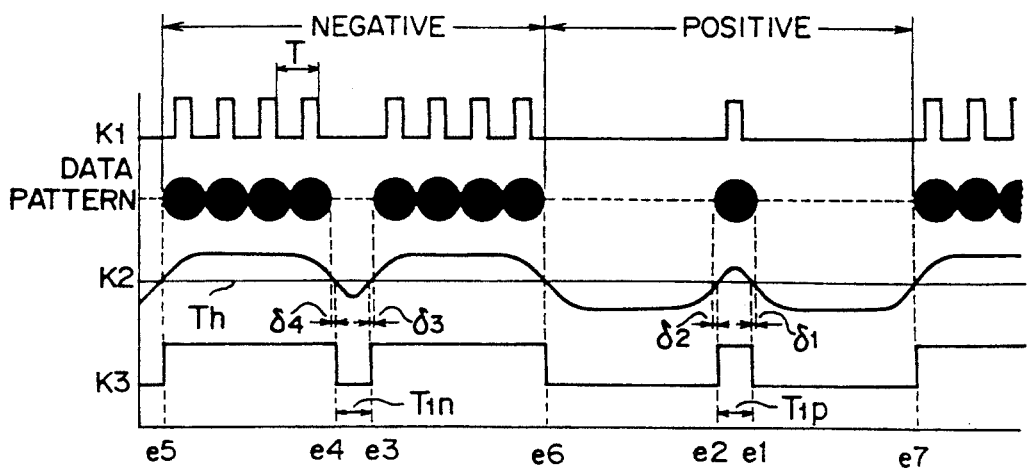
FIG. 2 is a graph showing signals and data patterns which are produced for measuring intersymbol interference according to the present invention.

When the target address is read out, the controller 7 activates a pattern generator 1 to output two test patterns, a negative test pattern [111101111] and a positive test pattern [000010000], alternatively and repeatedly, as shown by signal K1 in FIG. 2, first row. A drive circuit 2 amplifies the test pattern signal K1 and drives the read/write head 3 to write a data pattern on the aimed address of the medium 4. In this embodiment, since the read/write head 3 is an optical head, a data pattern is formed by a beam that forms a circle spot mark as shown in FIG. 2. Therefore, in response to the test pattern signal K1, the read/write head 3 produces a writing beam correspondingly to the bit "1" to form a marked area, and no beam is produced for the bit "0" to form a non-marked area. Accordingly, during the test pattern writing step, a data pattern shown in FIG. 2, second row is formed on the recording medium 4.

The data pattern corresponding to the negative test pattern is composed of an arrangement of a series of spot marks with an inclusion of one bit space at the mid-point thereof, and the data pattern corresponding to the positive test pattern is composed of an arrangement of a series of non-marked areas with an inclusion of one bit spot mark at the mid-point thereof. It is noted that the intersymbol interference shows the maximum degree at the boundaries between the marked areas and the mid-point in the negative test pattern, and also at the boundaries between the non-marked areas and the one bit spot mark at the mid-point in the positive test pattern.

According to the embodiment shown, controller 7, pattern generator 1, drive circuit 2 and read/write head 3 form a recording means.

In a reading step for reading the test patterns, the controller 7 gives an instruction to a servo circuit 9 to move the read/write head 3 to the track including the target address previously determined. Then, read/write head 3 reads the track and produce a signal K2 with reference to the information on the track. The amplifier 5 amplifies the signal produced by the read/write head 3. The address decoder 11 extracts an address information from the reproduction signal.

During the reading step, the controller 7 gives an instruction to a time interval analyzer 8 to reform signal K2 to a rectangular signal K3 using a threshold Th, and to start the measurement of intersymbol interference degree D in a manner which will be described in detail later. The signal read out..from the data pattern on the track is amplified by the amplifier 5 to generate a signal K2, as shown in FIG. 2. Because the spot marks are so densely packed on the track, the signal K2, as well as signal K3, is in an NRZ (non-return to zero) form, which is a reproduction of the signal K1 of a RZ (return to zero) form.

In the rectangular waveform signal K3, particularly in the negative test pattern, the two edges at times e4 and e3, forming a minimum transition interval, are shifted toward each other to shorten the time therebetween due to the intersymbol interference. Similarly, in the positive test pattern, the two edges at times e2 and e1, forming a minimum transition interval, are shifted towards each other due to the intersymbol interference. Therefore, in these test patterns, the minimum transition intervals have a width narrower than the true one bit width.

When compared with the true one bit width T, the edges at e1, e2, e3 and e4 in signal K3 are shifted by $\delta_1$, $\delta_2$, $\delta_3$ and $\delta_4$, respectively, as shown in FIG. 2. Using the shifted amounts $\delta_1$, $\delta_2$, $\delta_3$ and $\delta_4$, the minimum transition interval $T_{ip}$ between the rising edge at e1 and falling edge e2 and in the positive test pattern, and the minimum transition interval $T_{in}$ between the falling edge at e3 and the raising edge at e4 in the negative test pattern can be expressed by the following equations, respectively:

$$T_{1p} = T - \delta_1 - \delta_2 \qquad (2)$$

$$T_{in} = T - \delta_3 - \delta_4 \qquad (2)$$

The controller 7 gives an instruction to the time interval analyzer 8 to measure the $T_{1p}$ and the $T_{1n}$ by counting the elapsed time between e1 and e2, and between e3 and e4, respectively. To generalize the measurement of $T_{1p}$ and $T_{1n}$, the time interval analyzer 8 samples values smaller than 2T to collect all the minimum transition intervals and measures $T_{1p}$ and $T_{1n}$ 1000 times, each, which are then averaged to produce mean values $\overline{T}_{1p}$ and $\overline{T}_{1n}$.

When the $\overline{T}_{1p}$ is larger by a predetermined value $\delta_0$ than the $\overline{T}_{1n}$, meaning that the threshold Th is set at a level much lower than the optimum level of signal K2, the controller 7 gives an instruction to the time interval analyzer 8 to increase the threshold Th by a predetermined small amount $\Delta V$, and measure each of $T_{1p}$ and $T_{1n}$ 1000 times, again, which are then averaged to produce mean values $\overline{T}_{1p}$ and $\overline{T}_{in}$, in the same manner as described above.

On the contrary, when the $\overline{T}_{in}$ is larger by $\delta_0$ than the $\overline{T}_{1p}$, meaning that the threshold Th is set at a level higher than the optimum level of signal K2, the controller 7 gives an instruction to the time interval analyzer 8 to decrease the threshold Th by a predetermined small amount $\Delta V$, and measure each of $T_{1p}$ and $T_{1n}$ 1000 times, again, which are then averaged to produce mean values $\overline{T}_{1p}$ and $\overline{T}_{1n}$, in the same manner as described above.

When the difference between the $T_{1p}$ and $T_{1n}$ is lower than $\delta_0$, meaning that the threshold Th is set at a level approximately at the optimum point of signal K2, the mean values $\overline{T}_{1p}$ and $\overline{T}_{1n}$ are averaged to obtain an averaged minimum transition value $T_1$. Then, a difference between the true one bit width T and $T_1$ is calculated by the following equation:

$$T_1 - T = -(\delta_1 + \delta_2 + \delta_3 + \delta_4)/2. \tag{3}$$

This equation shows the amount of the intersymbol interference. Based on equation (3), the controller 7 executes the following calculation:

$$D = (\delta_1 + \delta_2 + \delta_3 + \delta_4)/4 = (T - T_1)/2 \tag{3}$$

to obtain the intersymbol interference degree D.

In such a way, it is possible to measure the jitter of the read/write system 12 caused by the intersymbol interference degree D. In the above embodiment, the read/write head 3, the amplifier 5, and the time interval analyzer 8 form a measuring means. The clock generator 6, the time interval analyzer 8 and the controller 7 form a calculating means.

According to a second embodiment of the present invention, it is possible to calculate the intersymbol interference degree D without the use of one bit width T.

According to the second embodiment, controller 7 gives an instruction to the time interval analyzer 8 to measure a long transition interval corresponding to four bits of series of "1s" in the negative test pattern [111101111] or of "0s" in the positive test pattern [000010000].

To obtain the long transition interval $T_{4n}$ in the negative test pattern, the time interval analyzer 8 measures the interval between the rising edge e5 and the falling edge e4 and between edges e3 and e6 for 1000 times. The long transition interval $T_{4p}$ in the positive test pattern is obtained in a similar manner. To generalize the measurement of $T_{4p}$ and $T_{4n}$, the time interval analyzer 8 samples values greater than 2T to collect all the long transition intervals and measures $T_{4p}$ and $T_{4n}$ 1000 times, each, which are then averaged to produce mean values $\overline{T}_{4p}$ and $\overline{T}_{4n}$, and these two are averaged to obtain an averaged long transition value $\overline{T}_4$. The averaged long transition value $\overline{T}_4$ can be expressed by the following equation:

$$\overline{T}_4 = 4T + (\delta_1 + \delta_2 + \delta_3 + \delta_4)/4. \tag{4}$$

Using equations (3) and (4), the following equation is executed:

$$D = (\delta_1 + \delta_2 + \delta_3 + \delta_4)/4 = (\overline{T}_4 - 4\overline{T}_1)/9 \tag{5}$$

$$= (\overline{T}_{4p} + \overline{T}_{4n} - 4\overline{T}_{1p} - 4\overline{T}_{1n})/18 \tag{5'}$$

to obtain the intersymbol interference degree D.

When the short transition interval has M bit length and long transition interval has N bit length, wherein M and N are integers and N being greater than M, the equation (5) is generalized as:

$$D = (\delta_1 + \delta_2 + \delta_3 + \delta_4)/4 = (M\overline{T}_N - N\overline{T}_M)/(M + 2N), \tag{6}$$

wherein $\overline{T}_M$ and $\overline{T}_N$ are averages of the measured values of the short transition interval and the long transition interval, respectively.

According to the second embodiment, it is not necessary to obtain the value of the clock T. The controller 7 and the time interval analyzer 8 form a calculating means.

In the above described first and second embodiments, a pattern generator 1 is employed to detect a quality of medium 4 in combination with the used read/write system 12. However, when the medium 4 is already recorded with the negative and positive test patterns, such a medium 4 can be used to test the quality of the read/write system 12. In this case, it is not necessary to employ the pattern generator 1.

Figure 3:
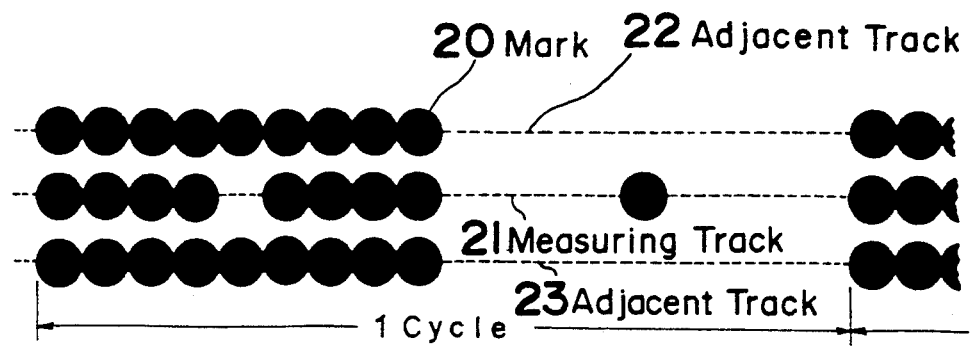
FIG. 3 is a graph showing data patterns produced for measuring the combination of intersymbol interference and cross-talk according to the present invention.

The following description is directed to a method for measuring simultaneously the intersymbol interference and the cross talk. FIG. 3 shows tracks in which the test patterns for simultaneously measuring the intersymbol interference and the cross-talk are recorded. A center track 21 has spot marks of the data pattern of [111101111] and [000010000], repeatedly, and the adjacent tracks 22 and 23 are recorded with [111111111] pattern at a part adjacent to [111101111] patterns and with [000000000] pattern at a part adjacent to [000010000]. When the intersymbol interference is measured by using a reproduction signal K2 from the measuring track 21, it is possible to measure an amount of an edge shift at the worst case where the largest intersymbol interference is combined with the largest cross-talk of the same polarity.

As explained above, the present invention makes it possible to measure easily the nearly largest value of the edge shift D, i.e., the degree of the intersymbol interference including the cross-talk, without any effect of the random noise.

An intersymbol interference detecting apparatus according to the present invention can be used as an apparatus for inspecting the recording medium with a defined standard recording reproduction apparatus and also as an apparatus for inspecting a recording reproduction apparatus with a defined standard recording medium.

In the embodiment explained above, a given recording pattern has the minimum transition interval positioned between the transition intervals in a length longer by four times than that of the minimum transition interval. It is possible to use another pattern for measurement when another pattern repeatedly has a short transition interval positioned between the long transition intervals. When the short transition interval differs from the minimum transition interval, the measured intersymbol interference is not the largest value of the intersymbol interference practically generated but can be used as a reference to measure indirectly the degree of the intersymbol interference.

An embodiment according to the present invention measures the interval as an average value obtained from 1,000 of the measured values. A variation of the measured value due to the random noise can be consequently decreased by 30 db. The measuring times for determining the average value can be selected properly in accordance with the amount of the random noise.

Figure 4:
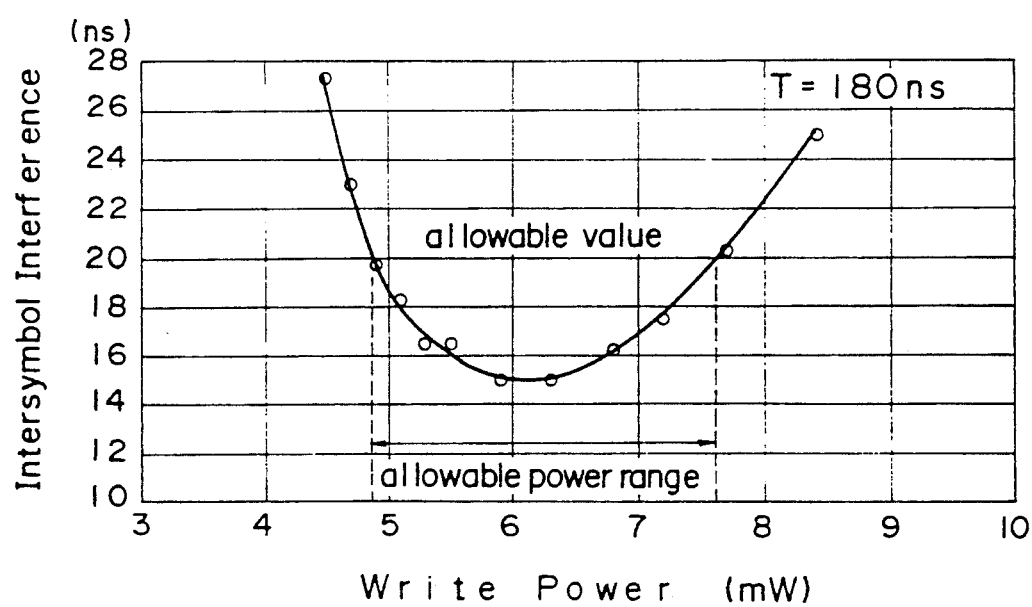
FIG. 4 is a graph showing the relationship between write power and intersymbol interference.

Referring to FIG. 4, one example of a relationship between the write power and intersymbol interference D is shown. According to this example in which one bit length T is equal to 180 ns, it is so judged that the recording medium 4 or the read/write system 12, whichever is the one being tested, is acceptable when the detected intersymbol interference degree D is less than 20 ns. Such a change of the intersymbol interference degree D is detected by the use of a beam control device (not shown) coupled to the read/write head 3. The beam control device controls the read/write head 3 to provide different levels of beam power.

Figure 5:
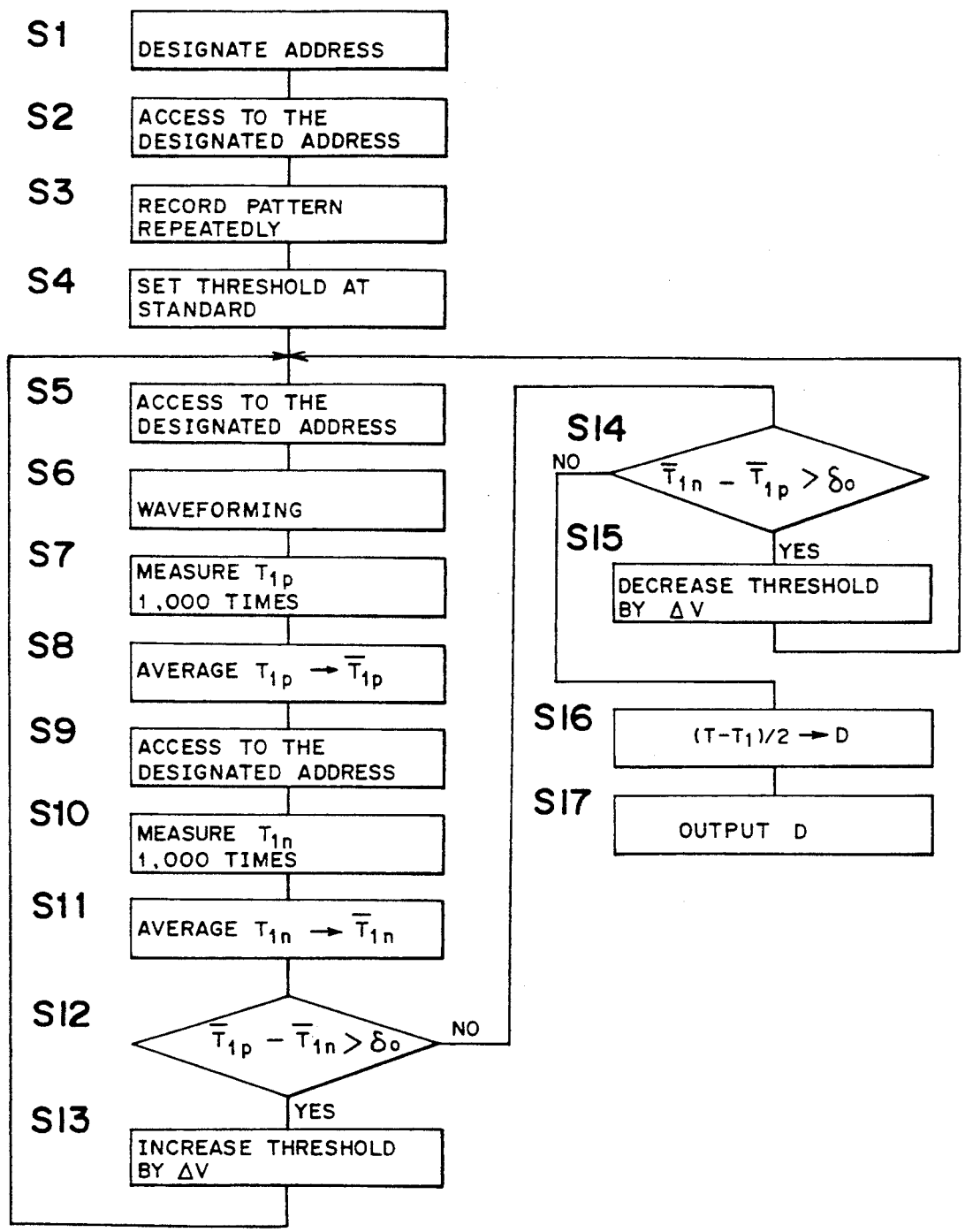
FIG. 5 and 6 are flow charts each showing an operation to measure the intersymbol interference, with reference to a bit length, according to the present invention.

Referring to FIG. 5, a flowchart of operation of the first embodiment according to the present invention is shown.

At step S1, the address on the track of the medium 4 in which the data pattern is written is designated.

At step S2, the read/write head 3 moves to the designated address of the medium 4 for recording the test patterns.

At step S3, the read/write head 3 writes the negative test pattern and positive test pattern repeatedly at the designated address.

At step S4, a threshold Th is set at a predetermined standard level.

At step S5, a read/write head 3 moves to the designated address where the positive test pattern is recorded for measuring the positive minimum transition interval $T_{1p}$.

At step S6, the time interval analyzer 8 shapes the waveform of the read signal to rectangular waveform based on the threshold Th.

At step S7, $T_{1p}$ is measured 1,000 times repeatedly.

At step S8, 1,000 of $T_{1p}$ are averaged to calculate a mean value $\overline{T}_{1p}$.

At step S9, the read/write head 3 moves to the designated address where the negative test pattern is recorded for measuring the negative minimum transition interval $T_{1n}$.

At step S10, $T_{1n}$ is measured 1,000 times repeatedly.

At step S11, 1,000 of $T_{1p}$ are averaged to calculate a mean value $\overline{T}_{1n}$.

At step S12, $\overline{T}_{1p}$ is reduced by $\overline{T}_{1n}$ and a difference therebetween is compared with a predetermined small amount $\delta_0$. When it is judged that $\overline{T}_{1p} - \overline{T}_{1n} > \delta_0$, the operation goes to step S13 at which the threshold Th is increased by $\Delta V$ and then returns to the step S5. Thereafter, the operation repeats steps S5 to S13 until it is judged that $\overline{T}_{1p} - \overline{T}_{1n} \leq \delta_0$ at step S12.

When it is judged that $\overline{T}_{1p} - \overline{T}_{1n} \leq \delta_0$ at step 12, the operation goes to the step S14 at which $\overline{T}_{1n}$ is reduced by $\overline{T}_{1p}$ and a difference therebetween is further compared with a predetermined small amount $\delta_0$.

At step S14, when it is judged that $T_{1n} - T_{1p} > \delta_0$, the operation goes to step S15 to decrease threshold Th by $\Delta V$, and returns to the step S5. The operation repeats steps S5 to S15 until it is judged that $\overline{T}_{1p} - \overline{T}_{1p} \leq \delta_0$. When it is judged that $\overline{T}_{1n} - \overline{T}_{1p} \leq \delta_0$, the operation goes to the step S16.

At step S16, equation (3') is carried out to obtain the intersymbol interference degree D which is output at step S17.

Figure 6:
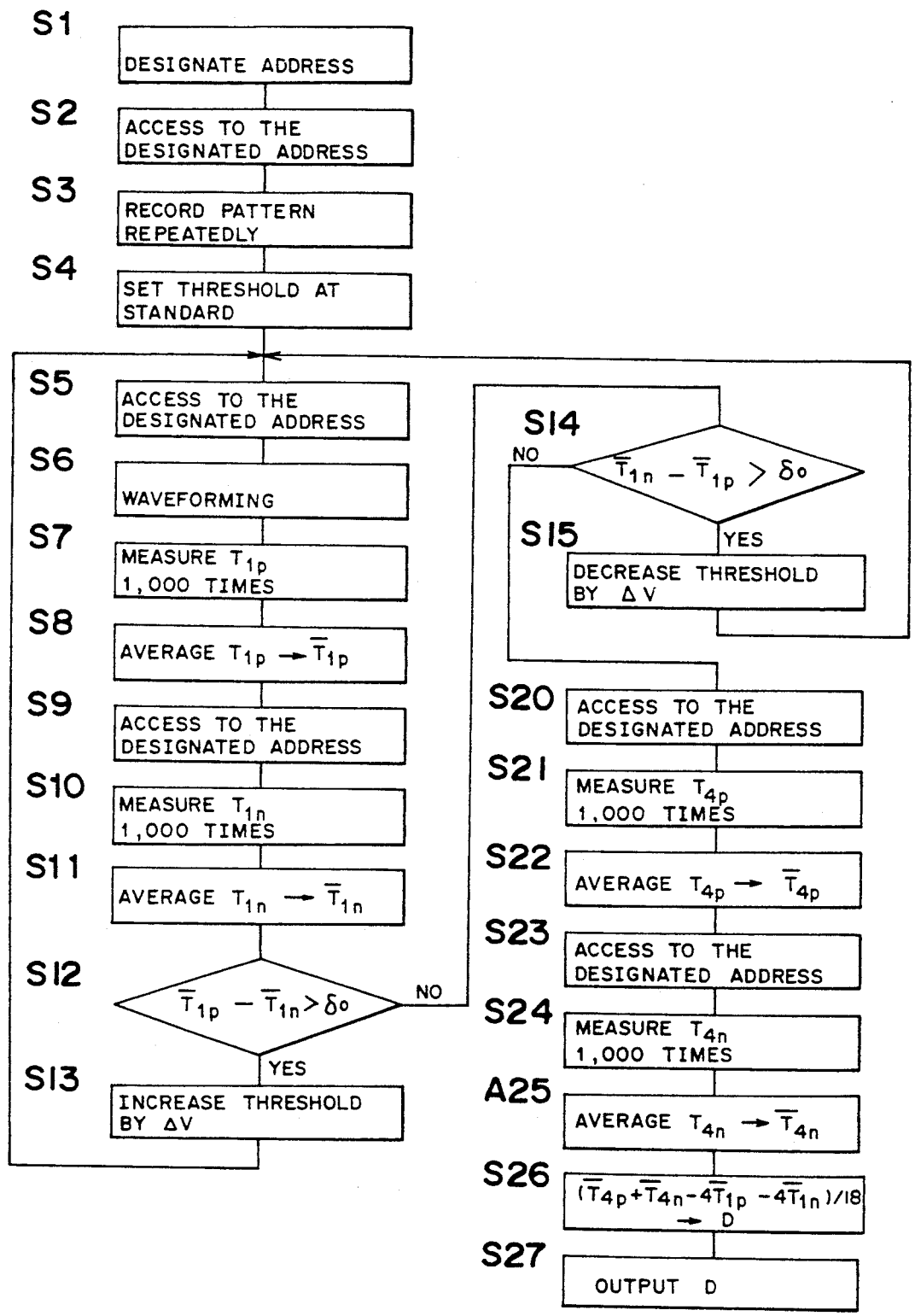

Referring to FIG. 6, a flowchart of operation of the second embodiment according to the present invention is shown. When compared with the flowchart of FIG. 5, the flowchart shown in FIG. 6 has steps S20 to S27 in place of steps S16 and S17. Therefore, only the newly added steps S20 to S27 are explained herein below.

At step S20, the read/write head 3 moves to the designated address where the positive test pattern is recorded for measuring the positive long transition interval $T_{4p}$.

At step S21, $T_{4p}$ is measured 1,000 times repeatedly.

At step S22, 1,000 of $T_{4p}$ are averaged to calculate a mean value $\overline{T}_{4p}$.

At step S23, the read/write head 3 moves to the designated address where the negative test pattern is recorded for measuring the negative long transition interval $T_{4n}$.

At step S24, $T_{4n}$ is measured 1,000 times repeatedly.

At step S25, 1,000 of $T_{4n}$ are averaged to calculate a mean value $\overline{T}_{4n}$.

At step S26, equation (5) is carried out to obtain the intersymbol interference degree D which is output at step S27.

Although the above described embodiments are directed to the read/write system with an optical read/record head 3, it is possible to use the present invention in a read/write system which employs an electromagnetic read/record head 3. In this case, the test patterns are formed by a magnetic field pattern. The edges of the magnetic field pattern can be detected using differentiator which produces a narrow pulse at such an edge. Therefore, peak to peak distance is measured to obtain the transition intervals.

Although the present invention has been fully described in connection with the preferred embodiments thereof with reference to the accompanying drawings, it is to be noted that various changes and modifications are apparent to those skilled in the art. Such changes and modifications are to be understood as being within the scope of the present invention as defined by the appended claims unless they depart therefrom.

What is claimed is:

1. An apparatus for detecting an intersymbol interference in a digital signal read out from a recording medium comprising:
    a clock generator for generating clock pulses having a predetermined cycle length;
    a pattern writing means for writing a predetermined data pattern on said medium, said data pattern having a short transition interval positioned between two long transition intervals;
    a reading means for reading said data pattern on said medium;
    a measuring means for measuring said short transition interval; and
    a calculating means for calculating an edge shift between said short transition interval and said long transition interval.

2. An apparatus for detecting an intersymbol interference as claimed in claim 1, wherein said pattern writing means writes said data pattern repeatedly on said medium.

3. An apparatus for detecting an intersymbol interference as claimed in claim 1, wherein said measuring means measures said short transition interval for a plurality of times, to produce an average of measured short transition intervals.

4. An apparatus for detecting an intersymbol interference as claimed in claim 1, wherein said reading means comprises a waveshaping means for shaping a waveform of said data pattern read by said reading means using a threshold.

5. An apparatus for detecting an intersymbol interference as claimed in claim 1, wherein said data pattern includes a first type data pattern in which said short transition interval is formed by at least one bit of a first level signal and a second type data pattern in which said short transition interval is formed by at least one bit of a second level signal.

6. An apparatus for detecting an intersymbol interference as claimed in claim 5, wherein said measuring means measures each of said short transition intervals of said first and second type data patterns for a plurality of times to produce averages of measured short transition intervals of said first and second type data patterns, respectively.

7. An apparatus for detecting an intersymbol interference as claimed in claim 6, wherein said measuring means produces a mean value of said averages of measured short transition intervals of said first and second type data patterns.

8. An apparatus for detecting an intersymbol interference as claimed in claim 5, wherein said reading means comprises a waveshaping means for shaping a waveform of said first and second data patterns read by said reading means using a threshold to produce said short transition intervals of said first and second type data patterns.

9. An apparatus for detecting an intersymbol interference as claimed in claim 8, wherein said threshold is varied to equalize said short transition intervals of said first and second type data patterns.

10. An apparatus for detecting an intersymbol interference as claimed in claim 1, wherein said pattern writing means comprises a beam producing means for writing spot marks which represent said data pattern.

11. An apparatus for detecting an intersymbol interference as claimed in claim 10, wherein said pattern writing means further comprises a beam control means to control said beam producing means to produced beams of different power.

12. An apparatus for detecting an intersymbol interference as claimed in claim 1, wherein said data pattern includes a first type data pattern in which said short transition interval .is formed by at least one bit of a first level signal and is surrounded by a plurality of bits of a second level signal in adjacent tracks, and a second type data pattern in which said short transition interval is formed by at least one bit of a second level signal and is surrounded by a plurality of bits of said first level signal in adjacent tracks.

13. An apparatus for detecting an intersymbol interference in a digital signal read out and transmitted from a recording medium comprising:
a pattern writing means for writing a predetermined data pattern on said medium, said data pattern having a short transition interval positioned between two long transition intervals, said short transition interval corresponding to M bit long data, said long transition interval corresponding to N bit long data, wherein N and M are integers and N being greater than M;
a reading means for reading said data pattern on said medium;
a measuring means for measuring said short transition interval and said long transition interval; and
a calculating means for calculating an edge shift between said long transition interval and said short transition interval.

14. An apparatus for detecting an intersymbol interference as claimed in claim 13, wherein said integer M is one.

15. A method for detecting an intersymbol interference in a digital signal read out and transmitted from a recording medium comprising the steps of:
generating clock pulses having a predetermined cycle length;
writing a predetermined data pattern on said medium, said data pattern having a short transition interval positioned between two long transition intervals;
reading said data pattern on said medium;
measuring said short transition interval; and
calculating an edge shift between said short transition interval and said long transition interval.

16. A method for detecting an intersymbol interference as claimed in claim 15, further comprising the step of writing said data pattern repeatedly on said medium.

17. A method for detecting an intersymbol interference as claimed in claim 15, further comprising the step of measuring said short transition interval for a plurality of times to produce an average of measured short transition intervals.

18. A method for detecting an intersymbol interference as claimed in claim 15, further comprising the step of waveshaping a waveform of said data pattern which has been read, using a threshold.

19. A method for detecting an intersymbol interference as claimed in claim 15, further comprising the step of writing a first type data pattern in which said short transition interval is formed by at least one bit of a first level signal and a second type data pattern in which said short transition interval is formed by at least one bit of a second level signal.

20. A method for detecting an intersymbol interference as claimed in claim 19, wherein said measuring step further comprises the step of measuring each of said short transition intervals of said first and second type data patterns for a plurality of times to produce averages of measured short transition intervals of said first and second type data patterns, respectively.

21. A method for detecting an intersymbol interference as claimed in claim 20, wherein said measuring step further comprises the step of producing a mean value of said averages of measured short transition intervals of said first and second type data patterns.

22. A method for detecting an intersymbol interference as claimed in claim 19, wherein said waveshaping step further comprises the step of waveshaping a waveform of said first and second data patterns which have been read, using a threshold to produce said short transition intervals of said first and second type data patterns.

23. A method for detecting an intersymbol interference as claimed in claim 22, wherein said waveshaping step further comprised the step of varying said threshold to equalize said short transition intervals of said first and second type data patterns.

24. A method for detecting an intersymbol interference as claimed in claim 15, further comprising the step of producing spot marks which represent said data pattern.

25. A method for detecting an intersymbol interference as claimed in claim 24, wherein said producing step further comprises the step of controlling a beam producing means to produce beams of different power.

26. A method for detecting an intersymbol interference as claimed in claim 15, further comprising the step of writing a first type data pattern in which said short transition interval is formed by at least one bit of a first level signal and is surrounded by a plurality of bits of a second level signal in adjacent tracks, and a second type data pattern in which said short transition interval is formed by at least one bit of a second level signal and is surrounded by a plurality of bits of said first level signal in adjacent tracks.

* * * * *